(12) United States Patent
Williamson et al.

(10) Patent No.: US 8,732,284 B2
(45) Date of Patent: May 20, 2014

(54) DATA SERIALIZATION IN A USER SWITCHING ENVIRONMENT

(75) Inventors: Steve Williamson, Oakdale, CA (US); Kevin Armstrong, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1145 days.

(21) Appl. No.: 11/326,849

(22) Filed: Jan. 6, 2006

(65) Prior Publication Data
US 2007/0162574 A1 Jul. 12, 2007

(51) Int. Cl.
*G06F 15/177* (2006.01)
*G06F 15/16* (2006.01)
*G06F 9/46* (2006.01)
*G06F 13/00* (2006.01)
*G06F 21/00* (2013.01)
*H04L 29/08* (2006.01)
*G06F 9/48* (2006.01)
*G06F 9/38* (2006.01)
*G06F 9/44* (2006.01)
*H04L 29/06* (2006.01)

(52) U.S. Cl.
CPC .......... *G06F 9/461* (2013.01); *H04L 29/08576* (2013.01); *G06F 9/4843* (2013.01); *G06F 9/3851* (2013.01); *G06F 9/4418* (2013.01); *H04L 29/08981* (2013.01); *H04L 63/083* (2013.01)
USPC ............. 709/222; 718/108; 709/227; 726/19; 713/183

(58) Field of Classification Search
CPC .. G06F 9/461; G06F 9/4418; H04L 29/08981
USPC ......... 709/220–266; 713/182–194; 710/1–74; 718/107–108; 726/16–21
See application file for complete search history.

(56) References Cited

U.S. PATENT DOCUMENTS

| | | | | |
|---|---|---|---|---|
| 6,807,666 | B1 * | 10/2004 | Evans et al. | 718/108 |
| 6,936,937 | B2 * | 8/2005 | Tu et al. | 310/12 |
| 6,981,048 | B1 * | 12/2005 | Abdolbaghian et al. | 709/228 |
| 7,010,612 | B1 * | 3/2006 | Si et al. | 709/232 |
| 7,334,193 | B2 * | 2/2008 | Stabb et al. | 715/778 |

(Continued)

FOREIGN PATENT DOCUMENTS

GB 2339935 A * 2/2000 ............... G06F 1/00

OTHER PUBLICATIONS

Brown, Keith. "Customizing GINA, Part 1." May 2005. MSDN Magazine. <http://msdn.microsoft.com/en-us/magazine/cc163803.aspx>.*

(Continued)

*Primary Examiner* — Luat Phung
*Assistant Examiner* — Kai Chang
(74) *Attorney, Agent, or Firm* — Womble Carlyle Sandridge & Rice LLP

(57) ABSTRACT

A method for sharing a common computing system among multiple users is disclosed. A user can perform a login process during which an input data, such as a user name or a password can be entered by the user to access a session. The user name and/or the password are then serialized into an object or a set of objects. If the serialized object or objects are authentic, a session is created and the session properties of the session are defined. Any applications that are subsequently executed during the session remain active after the session is switched out.

16 Claims, 5 Drawing Sheets

(56) References Cited

U.S. PATENT DOCUMENTS

| | | | |
|---|---|---|---|
| 7,373,393 B2* | 5/2008 | Sonoda et al. | 709/217 |
| 2001/0028368 A1* | 10/2001 | Swartz et al. | 345/835 |
| 2002/0038333 A1* | 3/2002 | Evans et al. | 709/107 |
| 2002/0143842 A1* | 10/2002 | Cota-Robles et al. | 709/1 |
| 2003/0069919 A1* | 4/2003 | Takahashi et al. | 709/108 |
| 2003/0182586 A1* | 9/2003 | Numano | 713/202 |
| 2003/0217159 A1* | 11/2003 | Schramm-Apple et al. | 709/228 |
| 2004/0139355 A1* | 7/2004 | Axel et al. | 713/202 |
| 2004/0153675 A1* | 8/2004 | Dorn et al. | 713/202 |
| 2005/0021777 A1* | 1/2005 | Nakao et al. | 709/228 |
| 2005/0066202 A1* | 3/2005 | Evans et al. | 713/202 |
| 2005/0091213 A1* | 4/2005 | Schutz et al. | 707/9 |
| 2005/0193117 A1* | 9/2005 | Morris | 709/227 |
| 2005/0204045 A1* | 9/2005 | Belkin et al. | 709/227 |
| 2005/0235051 A1* | 10/2005 | Brown et al. | 709/220 |
| 2007/0005693 A1* | 1/2007 | Sampath et al. | 709/204 |
| 2007/0088831 A1* | 4/2007 | Pallamreddy et al. | 709/227 |
| 2007/0101155 A1* | 5/2007 | Hoghaug et al. | 713/189 |
| 2007/0106993 A1* | 5/2007 | Largman et al. | 718/104 |

OTHER PUBLICATIONS

Brown, Keith. "Customizing GINA, Part 2." Jun. 2005. MSDN Magazine. <http://msdn.microsoft.com/en-us/magazine/cc163786.aspx>.*

* cited by examiner

DATA SERIALIZATION IN A USER SWITCHING ENVIRONMENT

TECHNICAL FIELD

This invention relates to a computer system.

BACKGROUND

Modern computer operating systems can be configured to support multiple users and to manage multiple user accounts by creating independent user sessions for each user on a single computing system (e.g., a personal computer). A user may simply log off his own session to allow another user to log on without being required to turning off the computer system.

Prior to allowing a user access to a session, a logon and authentication process is invoked which often includes prompting the user to enter a password that was previously established when the user account for the computer system was created. A conventional logon and authentication process can include prompting the user to enter their password, and retrieving the user's previously encrypted and stored password for comparison. Based on the results of the comparison, the user is provided access to their session.

The conventional authentication process described above requires that an encrypted password file be retrieved from a storage device and decrypted. Moreover, such a conventional process often requires several secondary applications (e.g., other than the primary logon application) to be invoked to perform the logon and authentication process. This can lead to an inefficient use of memory and processor cycles, and could translate into unnecessary delays in the logon process.

SUMMARY

Systems, methods, computer-readable mediums, user interfaces and other implementations are disclosed for switching multiple user sessions using an object serialization scheme, and providing expedited access to a previously established user session. User configuration data or session information associated with each user can be converted into one or more objects. Each object can hold one or more additional objects containing distinct data including, but not be limited to, a user name and a path to a user's picture. The object can be serialized and transmitted to a window server for switching out a current user session and initiates a new user session. As the new user session initializes, the serialized objects, in addition to parameters and settings related to the new user session, can be read from the window server. As the new user session is created, the serialized object is deserialized such that after deserialization, the user configuration information or session information are confirmed. If the confirmation succeeds, the initiation of the new user session proceeds. Otherwise, an error message is returned to the user.

In some implementations, a method of switching user sessions includes: retrieving user configuration data; receiving user input data; serializing the input data and the configuration data; deserializing the serialized input data and configuration data; and establishing a session based on the deserialized data.

In some implementations, a method of switching user sessions includes: receiving configuration data associated with a user to establish a user account; storing the configuration data; and authenticating the user to create a new session associated with the user account, where authenticating the user includes: receiving input data; serializing the input data and the configuration data; deserializing the serialized input data and configuration data; initiating the new session using the deserialized input data and configuration data; and implementing the deserialized configuration data in the new session.

In some implementations, a method of switching user sessions includes: establishing a first session for a first user, the first session being displayed as a current session under a first user account; receiving configuration data associated with a second user to establish a second user account; storing the configuration data; and authenticating the second user to create a second session associated with the second user account, where authenticating the second user includes: receiving input data; serializing the input data and the configuration data; deserializing the serialized input data and configuration data; and establishing the second session using the deserialized input data and configuration data.

In some implementations, a method of switching user sessions includes: receiving a set of user accounts, each of which corresponds with an established session; receiving a selection of a user account included in the set of user accounts; receiving input data; retrieving configuration data associated with the user previously stored at the time the selected user account was created; and comparing the input data with the retrieved user configuration data without serializing the input data.

Systems, methods, computer-readable mediums, user interfaces and other implementations also are disclosed for detecting an input device using an input device assistant. The input device assistant can be adapted to detect existing input devices as well as continuously monitor any new input device being added. A message can be displayed, for example, together with a login window to alert a user when a new input device is detected. The device assistant also can be adapted to retrieve the device's description either from the drivers embedded in the device, or from a Uniform Resource Locator (URL) provided by the device.

In some implementations, a method of switching user sessions includes: detecting an attempt to install a device in a computer system; determining if the device had been previously installed in the computer system; if the device had been previously installed, retrieving a device description associated with the previously installed device; and installing the detected device using the retrieved device description.

In some implementations, a method of switching user sessions includes: detecting a first input device and a second input device; launching an input device assistant to retrieve device description from the first input device; storing the retrieved device description; and if it is determined that the first input device is similar to the second input device, activating the second input device using the stored device description retrieved from the first input device without launching the input device assistant.

The details of one or more embodiments of the invention are set forth in the accompanying drawings and the description below. Other features, objects, and advantages of the invention will be apparent from the description and drawings, and from the claims.

DESCRIPTION OF DRAWINGS

The accompanying drawings, which are incorporated into and form a part of the specification, illustrate several aspects and implementations of the present invention and, together with the general description given above and detailed description given below, serve to explain the principles of the present invention. The drawings are only for the purpose of illustrating preferred implementations of the present invention, and are not to be construed as limiting the present invention. In the drawings.

Like reference symbols in the various drawings indicate like elements.

DETAILED DESCRIPTION

Figure 1:
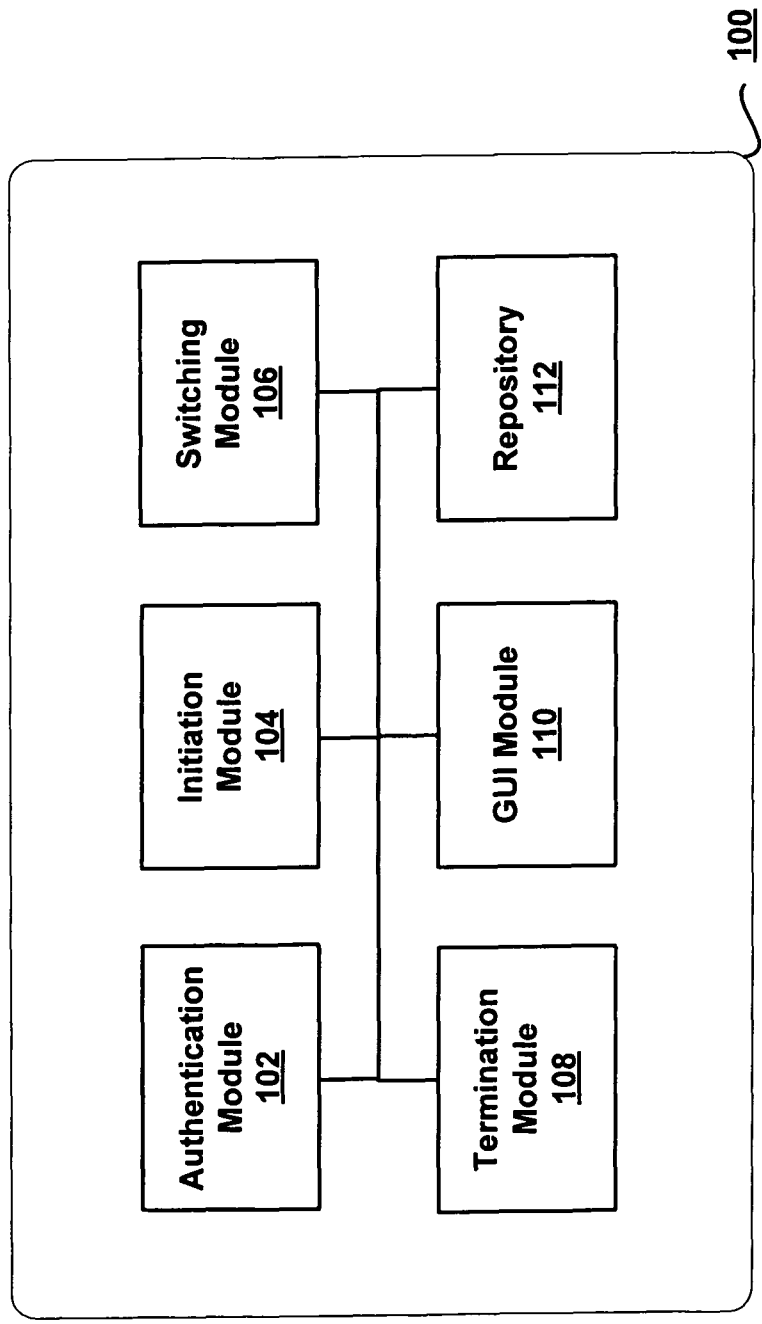
FIG. 1 is a block diagram of an exemplary software architecture for a multi-sessions manager.

In the following description, various implementations of the present invention will be described. However, it will be apparent to those skilled in the art that the implementations may be practiced with only some or all aspects of the invention. For purposes of explanation, specific numbers and configurations are set forth in order to provide a thorough understanding of the implementations. However, it will also be apparent to one skilled in the art that the implementations may be practiced without the specific details.

Systems, methods, computer program products, computer programs, media and means for switching an active user session associated with an established user account to another active user session associated with another established user account will be described. In some implementations, a multi-sessions manager is provided to facilitate the management of multiple active user sessions, including multiple active user sessions of an individual or various users.

A session as described herein generally refers to executions, processes or procedures that a user invokes at a computing device, including but not limited to running applications and/or viewing or modifying files or documents associated with the applications. A session can be specific to both the individual user and/or one or more application(s). In some instances, every user of an application can have a separate user session and access to a separate set of user session variables associated with its own session managed by the multi-sessions manager. In other instances, the same application can be executed in one or more new or existing user sessions.

In some implementations, the multi-sessions manager displays one or more graphical user interfaces for establishing a user account and initiating a user session associated with the established user account. The user can retrieve a previously engaged user session by logging onto the associated user account. Techniques for initiating or retrieving a user session can include selecting a user account from a listing of the established user accounts (e.g., a drop-down list or a pull-down list). The listing can be invoked in any convenient manner, for example, by keyboard strokes or mouse navigation. Once a user session is engaged, the user can launch software applications, review and edit documents, etc.

In some implementations, the multi-sessions manager can provide multiple users with flexibility and efficiency in managing multiple sessions involving different user accounts. For example, through one or more graphical user interfaces, the multi-sessions manager can provide a user with the ability to switch out an active user session and display another active user session associated with another user without compromising the security associated with the user sessions.

Graphical user interfaces associated with, for example, establishing a user account, initiating a user session, authenticating a user account and switching active sessions are described below by way of example, and are not intended to be limiting.

Multi-Sessions Manager Software Architecture Overview

FIG. 1 illustrates exemplary software architecture for a multi-sessions manager 100. The multi-sessions manager 100 enables the management of one or more user sessions each of which can be associated with a different user. The multi-sessions manager 100 can be integrated as part of an operating system and executed by one or more processors. The multi-sessions manager 100 can facilitate fast switching between sessions associated with different users without terminating sessions or suspending any application running in a session. Once a session is established, the established session can be stored for later retrieval by a user.

In some implementations, the multi-sessions manager 100 includes programming code or instructions (e.g., Java, Objective-C, etc.) for running a graphical user interface, for establishing a new user session or for reconnecting to a prior user session. The multi-sessions manager 100 provides a capability to switch from one user session to another user session, and permits any active applications in the former user session to remain active while allowing applications running in the latter user session to be executed simultaneously. The multi-sessions manager 100 keeps a list of applications, documents and other files that were previously active prior to the switching, and makes them available when a user logs into their session again.

In some implementations, the multi-sessions manager 100 can be implemented as one or more software modules or objects as described below. The modules can interact to provide multiple active user sessions.

The multi-sessions manager 100 generally includes an authentication module 102 configured to authenticate and validate an established user account, an initiation module 104 configured to establish a new user account, a switching module 106 adapted to facilitate switching between user accounts and a termination module 108 configured to terminate or log off one or more active sessions. The multi-sessions manager 100 may further include one or more additional modules and associated information. By way of illustration and without limitation, the multi-sessions manager 100 can incorporate one or more files, databases, services, combinations thereof, or other suitable means for establishing a new session or maintaining an established session associated with a user account. In some implementations, a GUI module 110 provides one or more graphical user interfaces for a user to create, access and modify a user account.

A repository 112 can contain mappings between users, sessions and applications. In some implementations, the repository 112 also can contain session information that identify applications associated with a session. For example, the session information can be stored in a configuration file, local storage or memory. The session information can contain configuration information related to a user account and can be created for the user at the time the user account is created. The session information can identify sessions and applications that are associated with a user account. For example, the session information can contain information that identifies a session and one or more applications associated with a user account, or an application that is to be started immediately upon creation or initial access of a session. The session information can further identify running applications that are currently being executed in the session on behalf of the user.

In some implementations, authentication and session management are configured by the authentication module 102, the initiation module 104 and the switching module 106 for authenticating users, establishing user accounts and switching between sessions, respectively. In these implementations, because the authentication process is executed within the authentication module 102, the manageability and security of multiple user sessions is improved.

In the implementations described above, after a user account is authenticated and the user's session associated with the authenticated user account is located, other user accounts and sessions remain active in the background with their applications still running and documents open. While any user account is switched out, the multi-sessions manager 100 ensures that all data and applications remain secure.

User Account Overview

A user account can be established for a user via a graphical user interface provided by the multi-sessions manager 100. For example, in one implementation, to establish a user account, the user can be assigned a user name, a password and other necessary configuration data by the multi-session manager 100. Alternatively, the user can specify a user name, password, short name, password hint and other configuration parameters for the new user account. These data can then be stored in a local disk or the repository 112. The user name or the password can be a string of numeric, alphabetical or alphanumeric characters of sufficient length so as to prevent being deciphered by unauthorized users. Administrative privilege also can be assigned to the new user account if desired. Then, a session is created for and subsequently associated with the new user account.

In some implementations, configuration information, including a user name and password specified by the user for accessing a particular user account during the set up of the user account, is processed based on object serialization and deserialization.

Object serialization is the process of converting an object to and from an architecture-independent byte stream. Basic object serialization only stores the values of the objects and does not record the data type of the objects nor the relationships between the objects. However, in instances where property list serialization is used, values and structure of the objects can be stored and recorded.

Likewise, object deserialization is a process of taking and recreating one or more original objects from the serialized data to retrieve user information or session information. As will be discussed in FIG. 2, the authentication process for authenticating a user serializes the user's configuration data, and deserializes it to validate a user's identity prior to granting access to a session.

In some implementations, user's configuration data are defined as a set of simple objects that can be serialized by the multi-sessions manager preserving only the general category of the objects, such as a dictionary, an array or the like.

Further details regarding the serialization/deserialization techniques are disclosed in a document "Archives and Serializations" published by Apple Computer, Inc., the disclosure of which can be found at http://developer.apple.com/documentation/Cocoa/Conceptual/Archiving/Archiving.pdf, and http://developer.apple.com/documentation/Cocoa/Conceptual/PropertyLists/PropertyLists.pdf, each of which is incorporated herein by reference in its entirety.

User Switching Process

Figure 2:
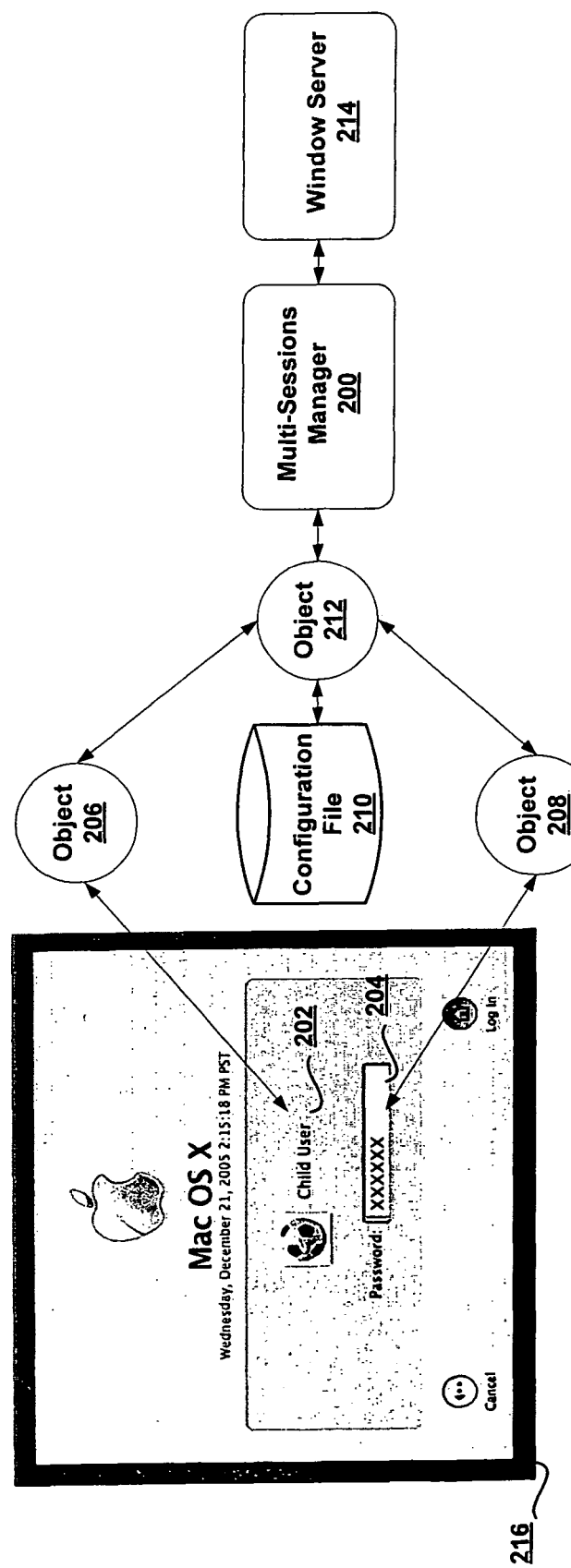
FIG. 2 is a conceptual diagram that illustrates an exemplary user switching process.

Referring now to FIG. 2, an exemplary user switching process for switching between sessions is shown. The user switching process requires a user to be authenticated prior to initiating a session. For the purpose of simplicity, the user switching process does not contain some elements that may be necessary in many practical applications. For example, the user switching process does not contain elements for generating the graphical user interface adapted to receive users' inputs. This additional element and other elements not mentioned will be discussed in reference to the enhanced process below in association with FIG. 3.

For the discussion of the user switching process, we assume that a user account "Child User" has previously been established with the multi-sessions manager 200. At the time the user account "Child User" was created, configuration data associated with this account (e.g., user name, personal settings and the like) have been specified (e.g., manually) by the user and securely stored, e.g., as a configuration file 210, by the multi-sessions manager 200. Subsequently, the user of the user account "Child User" initiates a switching request by invoking, for example, the dialogue screen 216, to validate his identity. The user switching process shown can include any mechanism that verifies the identity of the user to the operating system. A key or password known to the user, or biometric information also can be used to authenticate the user.

In some implementations, the dialogue screen 216 as demonstrated above can be implemented using markup language-based GUIs. For example, a dynamic hypertext markup language (HTML) can be used to generate the dialogue screen 216. Dynamic HTML provides a mechanism to include a wide variety of functional as well as non-functional features to dialogue screen 216. Other types of markup languages may be used to define the dialogue screen 216. For example, extensible markup language (XML) or extensible hypertext markup language (XHTML) may be used.

Detecting that the user has activated the user switching process, authentication can be performed including verifying a personal password entered by the user with that stored in a configuration file 210. Upon receipt of the password from the user, the user name 202, the password 204 and the configuration file 210 are respectively converted into object 206, object 208 and object 212, and the objects are then serialized using an object serialization scheme by the multi-sessions manager 200.

In some implementations, object 212 includes user configuration information or session information. Object 212 also can hold one or more objects containing distinct data including, but not be limited to, a user name and a path to a user's picture. For example, the password 204 entered by a user can be converted into object 204, and subsequently merged or combined with object 212 prior to serialization.

After the objects are serialized, the multi-session manager 200 transmits the serialized objects containing various user configuration information or session information to a window server 214 with a command to create a new user session associated with the user account "Child User". Upon receipt, the window server 214 switches out the current user session, and starts a new user session. As the new user session initializes, the serialized objects, in addition to parameters and settings related to the new user session, are read from the window server 214.

Next, the multi-sessions manager 200 deserializes the serialized objects. Generally, when a new user session is created, the serialized object is read from the window server 214 and deserialized. After deserialization, the user configuration information (e.g., password) or session information are confirmed. If the confirmation succeeds, a new user session is initiated, or a previous user session is redisplayed. Otherwise, an error message is returned to the user. That is, prior to granting access to the user associated with the new user session, the multi-sessions manager 200 processes the deserialized objects with an algorithm to verify the identity of the user using the submitted user name 202 and password 204. If the identity of the user is not confirmed, the user switching process will then return an error code to the user and prompt the input of another user name and/or password. Alternatively, if the identity of the user is confirmed, the new session is displayed to the user.

The following illustrates an exemplary process for authenticating a user account. After the user configuration information or session information entered by a user is serialized and transmitted to the window server 214, the window server 214 launches a login window application configured to read the serialized information from the window server 214. The login window then submits a request to a security server for the right to login a user, and subsequently passes the serialized information to the security server. The security server initiates a security application, and the security application runs one or more plugins. One of the plugins deserializes the serialized information, and verifies the user configuration information or session information by querying a directory services. The directory services takes the user configuration information and verifies that it matches the one provided when the user account was created. Once confirmed, the security server grants the login window's request to initiate a new user session via the multi-session manager. Otherwise, the security server notifies the login window with a failure code for generating an error dialog.

In some implementations, if a user only needs to access a previously established user session, rather than creating a new user session, the serialization process discussed above can be bypassed. In these implementations, the user can be prompted to re-enter a password that can be authenticated expeditiously with the window server 214. For example, using a one way conversion scheme, an original password specified by a user at the time a user account was created is converted into a set of numerical representation that is unique to that password such that the original password cannot simply be reconstructed using the numerical representation. Upon receiving a password for accessing a previously established session from a user, the received password is independently converted into a set of numerical representation, where it is then compared with the one created for the original password, for example, at the window server 214. In this manner, the original password does not need to be stored anywhere that can be maliciously retrieved by an unauthorized entity. Password verification can be done expeditiously in the appropriate manner. Other security mechanisms also can be extended to authenticate the user in an expedited manner.

In some implementations, the multi-sessions manager 200 may transmit the serialized objects to the window server 214 with a command to reinitiate a prior session, and to restore any files that were open or applications that were executed at the end of the user's previous session. That is, once a program or application is initiated, it continues to be active regardless of whether the session has been switched out. Settings and configuration data previously established by the user can be retrieved via the serialized objects by the multi-sessions manager 200 and restored to the user prior to displaying the session. Such settings and configuration data may include, but not be limited to, user files such as word processing documents, spreadsheets, presentations, media files, and application data such as templates for photo editing applications, instant messaging applications and spell checking dictionaries.

Though the objects identified above are described as being separate or distinct, one or more of the objects may be combined as a single object. The functional description provided herein including separation of responsibility for distinct functions is exemplary. Other groupings or other divisions of functional responsibilities can be made as necessary or in accordance with specific design preferences.

Though it has been shown that the serialized objects are deserialized prior to verifying the identity of the user, this order can be reversed so that the identity of the user is verified prior to deserializing the serialized objects.

In some implementations, the state and status of any files or applications associated with a previous user need not be restored, as they can be configured to continue running as background applications invisible to the current user that can be displayed again by simply re-logging (e.g., through authentication) onto the previous user's account.

Though the process identified above is implemented with a verification process, it also can be configured so that the user only needs to input a specific password only once, and subsequently can switch into a session without this repetitive step. Similarly, if a password has not been specified, the user can bypass the verification process to expeditiously access a session.

Unlike conventional systems where user's specified password is encrypted and stored for granting future access, in these implementations, encryption scheme for encrypting user's password is not required. The multi-session manager 200 also does not store a user's password or read the user's password from an encrypted password file when an access to a previously reestablished user session is requested.

In some implementations, the serialized objects 206, 208 and 212 may be serialized by a separate software application. Similarly, a separate software application may be incorporated for implementing the deserialization process for deserializing the serialized objects. In one aspect, the serialized objects may physically contain more data than is needed for deserialization. For example, source code serialization has user code mixed in with the code needed to deserialize an object. This user code can be preserved on serialization and passed over to the deserialization process when a user switching process is invoked.

Inside a session, the user can interact with various applications and programs. The user also can execute new applications, continue existing programs or terminate existing services. For example, the user can work in various word documents, check emails, browse internet web pages or listen to music files. While the user is logged on, the session can continue in existence, even if the session is switched out. That is, programs and applications continue execution during the time that the session is switched out and yet the user account remains logged on to the operating system.

Figure 3:
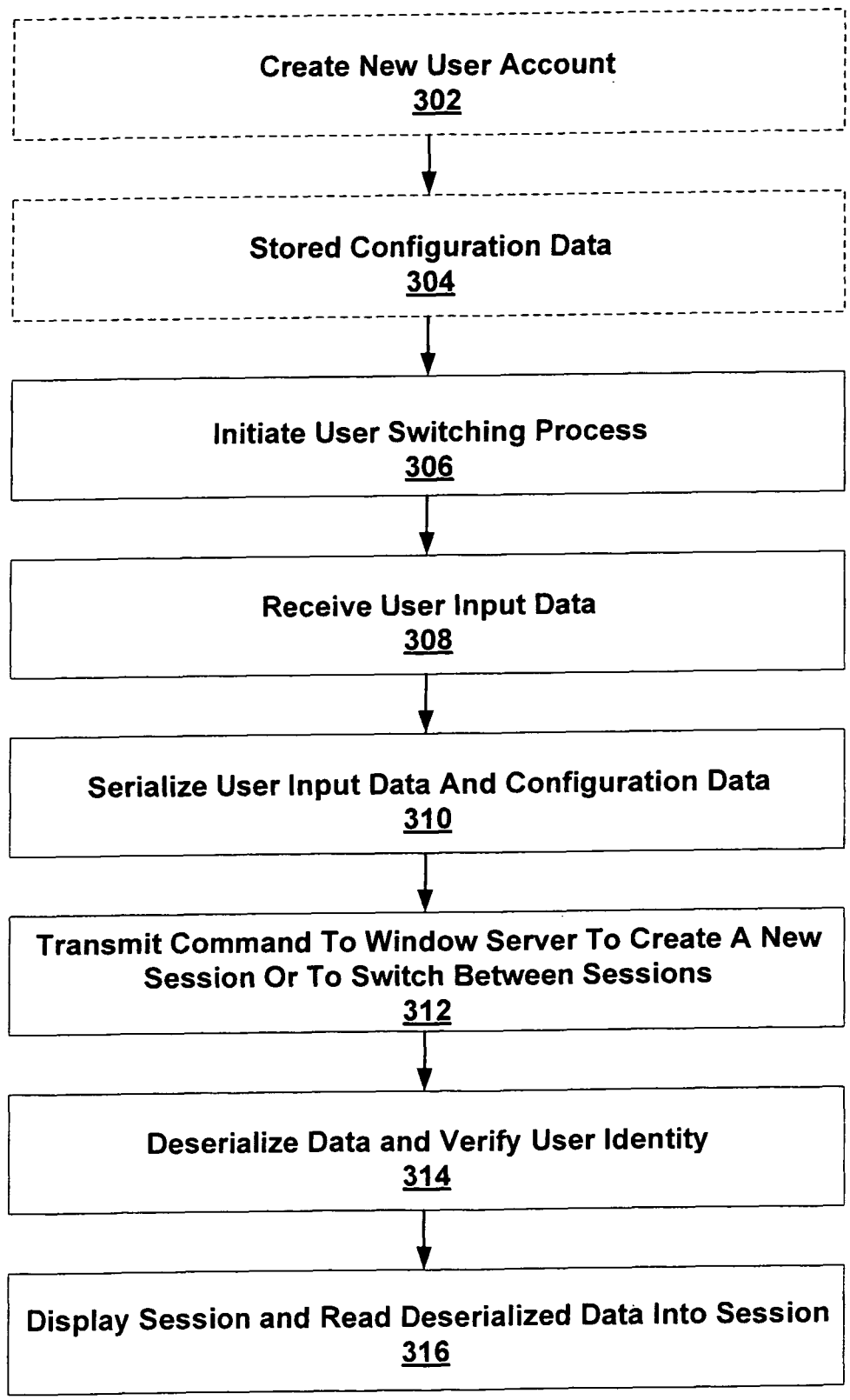
FIG. 3 is a flow diagram of an exemplary user switching process.

FIG. 3 is a flow diagram of a user switching process 300 for switching between sessions. Some of the steps of process 300 can be performed in parallel in multi-threading or multi-processing environments. In some implementations, the steps of process 300 are instructions in a computer-readable medium (e.g., hard drive, memory, buses, waveforms), which, when executed by a processor causes the processor to perform one or more steps of process 300. The steps of process 300 can be implemented in hardware, software, firmware or any combination thereof. Process 300 may be performed, at least in part, by, for example, the multi-sessions manager 100 running on an operating system. The process 100 begins when a request to create a user account is received (302). The request can be initiated by a user through an input device (e.g., keyboard strokes or mouse clicks) or programmatically, either directly or through an application programming interface (API) or user graphical interface.

In some implementations, the user establishes a user name and a password associated with the new user account. In other implementations, the user may manually specify configuration data associated with the user through one or more of the following: a supplied password field configured to receive inputs to specify a username and password of the new user account; a picture field configured to receive an input to modify a graphical identifier graphically representing the user account; a login items field configured to add or delete one or more applications or documents that automatically launch without user intervention upon access to the user account; and a parental controls field to facilitate monitoring and imposing restricted access of one or more applications for a particular user account.

In some implementations, at least one user account (e.g., administrator or owner of the operating system) has already been established prior to operation 302. In other implementations, operation 302 can request that the user adding a user account possess appropriate administrative privileges before a new account can be added. Otherwise, an error message can be returned to the user indicating that administrative privilege is required.

Once a new user account has been created, a user's configuration data is securely stored, e.g., as a configuration file, at a local hard disk, or the repository of the multi-sessions manager (304). The user can select to access his own session by enabling the user switching process 300 (306), and entering input data (308) for verifying his identity. In some implementations, the user's configuration data has already been stored as a configuration file that can be retrieved. In such an implementation, once a user accounted is created, the user can bypass operations 302 and 304 when accessing a session subsequently. The input data, together with the configuration file previously stored, are then converted into one or more objects, and the object(s) is serialized (310). A command is also sent to a window server to create a new session or to initiate a process of switching out the current session (312). The serialized object can then be deserialized to retrieve user information or session information, and the identity of the user is verified (314). If the identity of the user is confirmed, the new session is displayed to the user. Prior to or after the second session is displayed, if personal settings (e.g., background settings, computing device color preferences, icons and location of those icons, audio settings, font settings and printing preferences) are previously specified, such information can be retrieved from the deserialized object and incorporated into the new session (316).

In some implementations, operations 310, 312, 314 and 316 may be performed in the order listed, in parallel (e.g., by the same or a different process, substantially or otherwise non-serially), or in reverse order to achieve the same result. For example, after receiving the user input data, the process 300 may create and display a new session first, subsequently serialize the received user input data and deserialize the serialized data prior to granting access to the user. As another example, after receiving the user input data, the process 300 may sequentially verify the user's identity, create and display a new session, and serialize and deserialize input data incorporating the specified settings for the user. As yet another example, the process 300 may receive and serialize the user input data and create a new session incorporating the user's personal settings by deserializing the serialized data prior to verifying the identity of the user.

In other implementations, if the user only wants to reconnect to a previously established session, the user can bypass operations 302 and 304. In yet other implementations, if the user is a guest, the user can forego operation 302, 304, 310 or 314, or combinations thereof. In yet other implementations, any of the operations 302-316 may be performed by two or more entities rather than by a single entity.

Example of Using Fast Switching Process

To illustrate the foregoing implementations, suppose that two users (namely, a first user and a second user) and two respective sessions (namely, a first session and a second session) have been established by the initiation module 104 (FIG. 1). The first user executes two applications (e.g., internet browser and word processor), and leaves without terminating the first session. The second user comes to use the desktop computer, and logs on to the second session without logging off the first user. The multi-session manager 100 recognizes that the second user is affiliated with a previously established session, namely the second session. Rather than creating a new session for the second user, if a password has previously been specified, the authentication module 102 prompts the second user for the password so as to verify that the second user has access to the second session.

In response to the received password, the authentication module 102 serializes the received password and other known data previously configured or stored by the second user including querying the information associated with the second user stored, e.g., in the repository 112. If it is determined that the serialized information is not authentic, the authentication module 102 returns an error message to the second user indicating that the received password is incorrect. Alternatively, if it is determined that the serialized information is authentic, the switching module 106 communicates with, e.g., transmits a command, to a window server to re-associate the second user with the previously established second session, switches out the first session, and displays the desktop environment of the second session.

In some implementations, the state and status of any running application associated with the second session are retrieved, e.g., from the repository 112, and restored for the second user prior to displaying the second session. In other implementations, the state and status of these applications need not be restored or retrieved from the repository 112, as they are already running as background applications invisible to the previous user that can be displayed again by simply re-logging (e.g., through authentication) onto the associated user account.

Though the process identified above is implemented with an authentication procedure, it can be configured so that the user only needs to input a specific password only once, and subsequently can switch into a session without this repetitive step. Similarly, if a password has not been specified, the user can bypass the authentication procedure to expeditiously access a session.

Meanwhile, the internet browser and the word processor executed by the first user during the first session remain active in the background while the first session is switched out. Thus, when the first user comes back to log on to the first session, the status of these applications remains unchanged, and the first user can continue with these applications at their previous state without a need to restart and restore them.

Once the second user completes the second session, the second user can choose to terminate or log off the second session (e.g., via the termination module 108).

To simplify the description of hosting multiple user sessions, only two users have been illustrated. However, the exemplary process described above can easily be extended to accommodate additional users and/or sessions.

In some implementations, the modules described above are implemented as independent memory-resident processes including, but not limited to, UNIX™ processes capable of communicating with each other using inter-process communication facilities such as queues, semaphores, sockets, pipes, shared memory and the like. These modules can be programmed using programming languages and techniques such as C, Objective-C, C++ and Java. The number, nature and functionality of the modules described herein could be differently designed, and therefore should not be a limiting factor in construing the multi-sessions manager 100.

Furthermore, though the modules identified above are described as being separate or distinct, one or more of the modules may be combined in a single process or routine. The functional description provided herein including separation of responsibility for distinct functions is exemplary. Other groupings or other divisions of functional responsibilities can be made as necessary or in accordance with specific design preferences.

Keyboard Monitoring

Input devices, such as a keyboard, allow each user to interact with the operating system and its installed applications. Among multiple user accounts sharing the same computer system, one user may prefer using a particular input device that may be different from those used by other established users. For example, some users may prefer using US-enhanced keyboards, while other users may prefer using keyboards having a foreign language and/or layout.

Accordingly, in some implementations, using a keyboard as an exemplary input device, the operating system can automatically launch a keyboard assistant application for detecting the actual type of the new input device to ensure that the new input device can be properly installed. The keyboard assistant can be configured to support automatic discovery, zero-configuration and easy installation for a breadth of input device categories from a wide range of vendors. The keyboard assistant can be integrated as part of or separated from an operating system or the multi-sessions manager. Information relating to previously installed keyboards (e.g., manufacture ID, device ID, etc.) can be stored locally, and used by the keyboard assistant to guide the user to configure the keyboard for use with the operating system.

In some implementations, a device assistant can be adapted to detect existing input devices as well as continuously monitor any new input device being added. A message can be displayed, for example, together with the login window 316, to alert a user when a new input device is detected.

When the device assistant has discovered a new input device, the device assistant may know nothing about the functionality of the new input device. For the device assistant to learn about the input device and its capabilities, or to interact with the new device, the device assistant can be adapted to retrieve the device's description either from the drivers embedded in the device, or from a Uniform Resource Locator (URL) provided by the device. For example, if a device has a URL, then the device assistant can retrieve a driver of the device from this URL, load the driver into the hardware system 100, and allow the user to control the device and/or view device status.

In some implementations, the device assistant retrieves a description of the detected device including vendor-specific, manufacturer information such as the model name and number, serial number, manufacturer name, URLs to vendor-specific Web sites and the like. The device assistant also can retrieve a list of commands or actions the device functions to provide as well as parameters or arguments for responding to each action.

The detected device may contain other logical devices, functional units, or services. Thus, in some implementations, the keyboard assistant can be adapted to also retrieve these embedded devices or services.

Once the input device is added to the hardware system 100 using the retrieved description, the device assistant may assign a name for the new device, and allow the device to advertise its services to each user based on the assigned name. The device may also use that name in subsequent operations.

In some implementations, a device assistant also can prompt the user to, for example, manually enter configuration information associated with the detected device, or install the necessary software for activating the detected device. Any configuration information entered by the user can be stored so that if a similar input device is subsequently detected, such information can be retrieved to activate this input device.

For example, a user may want to add a new keyboard having a French layout to the list of existing input devices of a computer system. An operating system of the computer system detects that configuration data associated with the new keyboard does not exist, and therefore launches a keyboard assistant to retrieve necessary data from either the user or the new keyboard for activating the new keyboard. The user then manually enters description (e.g., product ID, serial number and the like) of the new keyboard based on the configuration data provided by the manufacturer or vendor, and the keyboard assistant installs the new keyboard based on this information. The keyboard assistant also stores this data entered by the user at a local storage or database. Subsequently, a second new keyboard having a French layout is detected. The operating system discovers that this second new keyboard is the same type as that installed previously. Rather than launching the keyboard assistant to retrieve configuration data, the operating system proceeds to activates the second new keyboard using the configuration data previously entered by the user and stored at the local storage.

Figure 4:
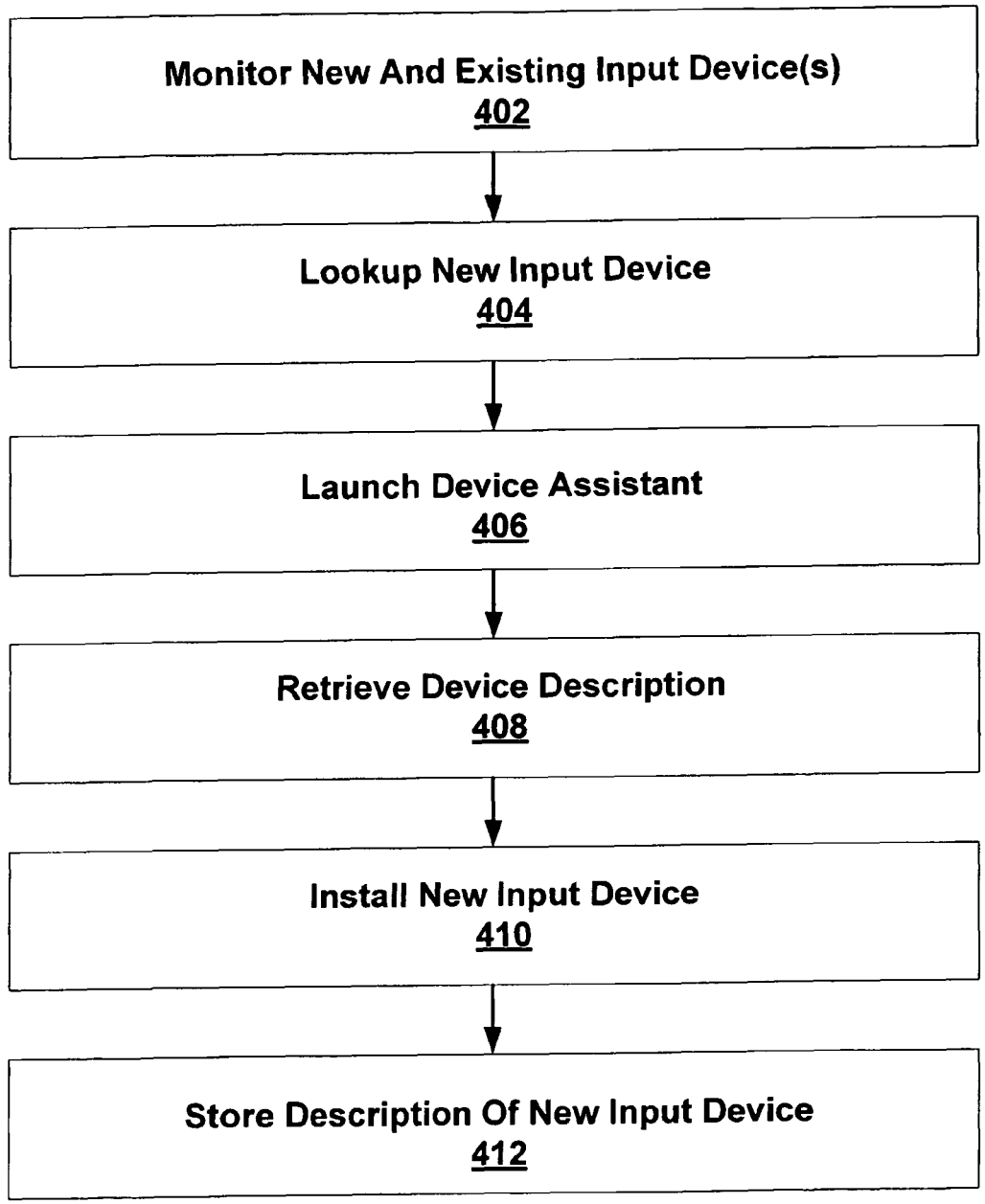
FIG. 4 is a flow diagram of an exemplary keyboard monitoring process.

FIG. 4 is a flow diagram illustrating an exemplary input device detection process 400. Referring to FIG. 4, the process 400 begins with monitoring existing input devices and any new input device (402). The process 400 can be configured to monitor for new input devices on a scheduled or continuous basis. If a new input device is detected, the process 400 may first verify to determine if the input device has previously been installed. If it is determined that the input device was previously installed and yet was removed, the process 400 can proceed to retrieve the driver for the detected device from, for example, a local disk (e.g., hard disk, RAM or ROM). Once the driver is loaded to the computer system, and the detected device can be manually controlled, the process 400 restarts from the operation 402.

Alternatively, if it is determined that the detected device has never been installed, a device assistant can be launched by the process 400 (406). The device assistant can be configured to retrieve description of the detected device including vendor-specific, manufacturer information such as the model name and number, serial number, manufacturer name, and URLs to vendor-specific Web sites (408). The operation 406 may further include retrieving a list of commands or actions the detected device functions to provide as well as parameters or arguments for responding to each action.

The new input device is then installed by the device assistant (410), and the retrieved description of the new input device is subsequently stored (412) for later retrieval if a similar input device is detected.

Hardware System Overview

Figure 5:
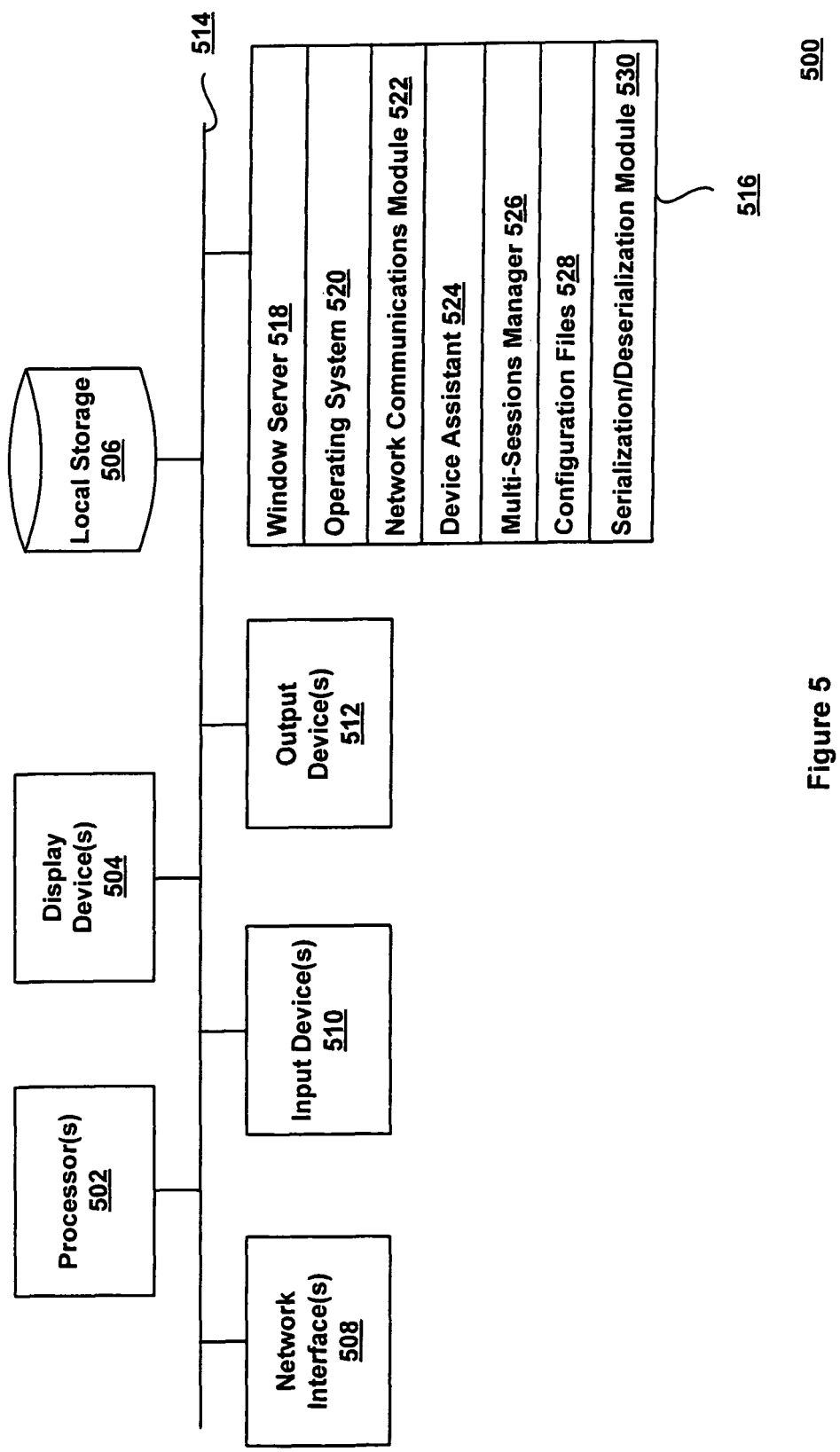
FIG. 5 is a block diagram illustrating an exemplary hardware system for supporting multiple sessions.

FIG. 5 is a block diagram illustrating a hardware system 500 that supports multiple active user sessions. The hardware system 500 shown can be implemented as a computing device including a desktop or portable computer, an electronic device, a telephone, a cellular telephone, a display system, a television, a monitor, a navigation system, a portable music device, a personal digital assistant, a handheld electronic device, an embedded electronic device or appliance or other forms of devices with user interfaces. The hardware system 500 can be a standalone computer that can interface with other desktop computers, network computers and servers to access and exchange files or information that is not stored locally.

The hardware system 500 can include one or more processors 502 (e.g., IBM PowerPC®, Intel® Pentium IV, etc.) for executing program instructions embedded in the processors 502 or other hardware components coupled to the processors through one or more buses 514. The hardware system 500 also can include one or more display devices 504 (e.g., CRT, LCD) that can be part of or separate from the hardware system 500. The hardware system 500 further includes a local storage 506 (e.g., computer hard disk) for storing program instructions, data or both, a network interface 508 (e.g., Ethernet connection), input devices 510 (e.g., keyboard, mouse, touch pad or stylus pen) to allow user input, output devices 512 (e.g., scanner, speaker and printer) to provide information to the user, and one or more computer-readable mediums 516. The computer-readable mediums 516 can be one of a floppy disk or CD-ROM that may be used to transfer computer instructions or data to the processors 502 or other hardware components for execution. Each of the hardware components described in the hardware system 500 can exchange communications and data via the bus(es) 514 (e.g., PCI, PCI Express, USB, FireWire™, NuBuS™ and PDS).

In some implementations, if a keyboard is used as one of the input devices, the keyboard can be a physical QWERTY device, a phone dial pad, a keypad, mouse, jog wheel, joystick, game pad or other input device. In other implementations, the keyboard can be a virtual or soft key keyboard displayed on, for example, the display device 504 or other touch screen device. In some implementations, the keyboard allows a user to input information with keystrokes which can be translated to electrical or data signals. Information provided by the input devices 510 can be in the form of navigational, functional, textual or other input. Navigation information can be directional (e.g., up, down, left, or right). The keyboard also can provide other forms of input including functions (e.g., a selection function for selecting an object), text input and the like. Information can be provided by the user manipulating the input devices 510. In some implementations, the processor(s) 502 can generate and display information to the display device 512 in response to user interactions received through the input devices 112.

In some implementations, the computer-readable medium (s) 516 refers to any medium that participates in providing instructions to the processor(s) 502 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 516 further includes a window server 518 adapted to execute tasks (e.g., serving windows) on behalf of a user (or operating system), an operating system 520 responsible for the direct control and management of hardware and software operations, a network communication module 522 for providing data conmmunication through one or more networks to other data devices that can use electrical, electromagnetic or optical signals, a device assistant 524 adapted to monitor new and existing input devices, a multi-sessions manager 526 configured to provide multiple active window users, including the various task described with respect to FIGS. 2-4, configuration files 528 for storing previously connected input device information and information associated with one or more users associated with the hardware system 500, and a serialization/deserialization module 530 for serializing or deserializing data contained, for example, in the configuration file 528.

The operating system 520 can be multi-user, multiprocessing, multitasking, multithreading, real-time and the like. The operating system 520 can be, for example, MAC OS® by Apple Computer, Inc. of Cupertino, Calif., a Microsoft Windows® operating system, Linux, a mobile operating system, control software, and the like. More generally, a kernel layer (not shown) in operating system 520 can be responsible for general management of system resources and processing time. A core layer can provide a set of interfaces, programs and services for use by the kernel layer. A user interface layer can include APIs (Application Program Interfaces), services and programs to support user applications.

In some implementations, the operating system 520, in coordination with multi-sessions manager 526, displays one or more graphical user interfaces. The graphical user interface can display individual items including, for example, an icon, a shortcut, a program launcher, a button, a menu bar, navigation items, a window, selections and the like. Each item can provide access to functionality, applications, configuration of a user account, and data associated with a particular user.

Generally, the operating system 520 can perform basic tasks, including, but not limited to: recognizing input from input devices 510; sending output to display devices 504; keeping track of files and directories on computer-readable mediums 516 (e.g., memory or a storage device); and managing traffic on the bus 514.

Various modifications may be made to the disclosed implementations and still be within the scope of the following claims.

What is claimed is:

1. A method for switching user sessions, the method comprising:

in a first session of a first user, serializing session information of the first session of the first user, wherein the serialized session information includes session settings of the first session and login credentials of the first user in a byte stream separate from a system password file, and the session settings of the first session include a plurality of documents open in a plurality of applications;

in a currently displayed session of a second user, receiving a request to switch from the session of the second user to a session of the first user;

deserializing the serialized session information; and
establishing a second session of the first user based on the deserialized session information, including:
    authenticating the first user using the login credentials of the first user deserialized from the byte stream and retrieved from the deserialized session information, without requiring the first user to be authenticated using the system password file,
    configuring the second session using the session settings deserialized from the byte stream, wherein configuring the second session includes the plurality of documents open in the plurality of applications of the first session, and
    switching out the currently displayed session of the second user to display the second session of the first user, including providing for display the second session of the first user including providing for display the plurality of documents open in the plurality of applications of the first session.

2. The method of claim 1, wherein the login credentials of the first user include a user name of the first user and a password of the first user.

3. The method of claim 1, wherein the first session of the first user includes a process associated with the first user and executing as a background process, and configuring the second session using the session settings includes restoring the process of the first session of the first user from the background.

4. The method of claim 1, wherein each of the first session of the first user and the second session of the first user includes at least one of an application program or a desktop environment.

5. The method of claim 1, wherein switching out the currently displayed session of the second user includes executing a process associated with the second user in the background.

6. A computer program product tangibly stored on a non-transitory storage device, the product configured to cause one or more computers to perform operations comprising:
    in a first session of a first user, serializing session information of the first session of the first user, wherein the serialized session information includes session settings of the first session and login credentials of the first user in a byte stream separate from a system password file, and the session settings of the first session include a plurality of documents open in a plurality of applications;
    in a currently displayed session of a second user, receiving a request to switch from the session of the second user to a session of the first user;
    deserializing the serialized session information; and
    establishing a second session of the first user based on the deserialized session information, including:
        authenticating the first user using the login credentials of the first user deserialized from the byte stream and retrieved from the deserialized session information, without requiring the first user to be authenticated using the system password file,
        configuring the second session using the session settings deserialized from the byte stream, wherein configuring the second session includes the plurality of documents open in the plurality of applications of the first session, and
        switching out the currently displayed session of the second user to display the second session of the first user, including providing for display the second session of the first user including providing for display the plurality of documents open in the plurality of applications of the first session.

7. The product of claim 6, wherein the login credentials of the first user include a user name of the first user and a password of the first user.

8. The product of claim 6, wherein the first session of the first user includes a process associated with the first user and executing as a background process, and configuring the second session using the session settings includes restoring the process of the first session of the first user from the background.

9. The product of claim 6, wherein each of the first session of the first user and the second session of the first user includes at least one of an application program or a desktop environment.

10. The product of claim 6, wherein switching out the currently displayed session of the second user includes executing a process associated with the second user in the background.

11. A system, comprising:
one or more computers configured to perform operations comprising:
    in a first session of a first user, serializing session information of the first session of the first user, wherein the serialized session information includes session settings of the first session and login credentials of the first user in a byte stream separate from a system password file, and the session settings of the first session include a plurality of documents open in a plurality of applications;
    in a currently displayed session of a second user, receiving a request to switch from the session of the second user to a session of the first user;
    deserializing the serialized session information; and
    establishing a second session of the first user based on the deserialized session information, including:
        authenticating the first user using the login credentials of the first user deserialized from the byte stream and retrieved from the deserialized session information, without requiring the first user to be authenticated using the system password file,
        configuring the second session using the session settings deserialized from the byte stream, wherein configuring the second session includes the plurality of documents open in the plurality of applications of the first session, and
        switching out the currently displayed session of the second user to display the second session of the first user, including providing for display the second session of the first user including providing for display the plurality of documents open in the plurality of applications of the first session.

12. The system of claim 11, wherein the login credentials of the first user include a user name of the first user and a password of the first user.

13. The system of claim 11, wherein the first session of the first user includes a process associated with the first user and executing as a background process, and configuring the second session using the session settings includes restoring the process of the first session of the first user from the background.

14. The system of claim 11, wherein each of the first session of the first user and the second session of the first user includes at least one of an application program or a desktop environment.

15. The system of claim 11, wherein switching out the currently displayed session of the second user includes executing a process associated with the second user in the background.

16. A method for switching user sessions, the method comprising:

in a displayed session of a second user, receiving a request to switch to a second session of a first user; and in response to the request:

deserializing serialized session information of a first session of the first user, wherein the session information includes session settings of the first session and login credentials of the first user in a byte stream separate from a system password file, and the session settings of the first session include a plurality of documents open in a plurality of applications, and establishing the second session of the first user based on the deserialized session information, wherein establishing comprises:

authenticating the first user using the login credentials of the first user deserialized from the byte stream and retrieved from the deserialized session information, without requiring the first user to be authenticated using the system password file, configuring the second session using the session settings deserialized from the byte stream, wherein configuring the second session includes the plurality of documents open in the plurality of applications of the first session, and switching out the session of the second user to display the second session of the first user, including providing for display the plurality of documents open in the plurality of applications of the first session.

* * * * *